Figure 1:
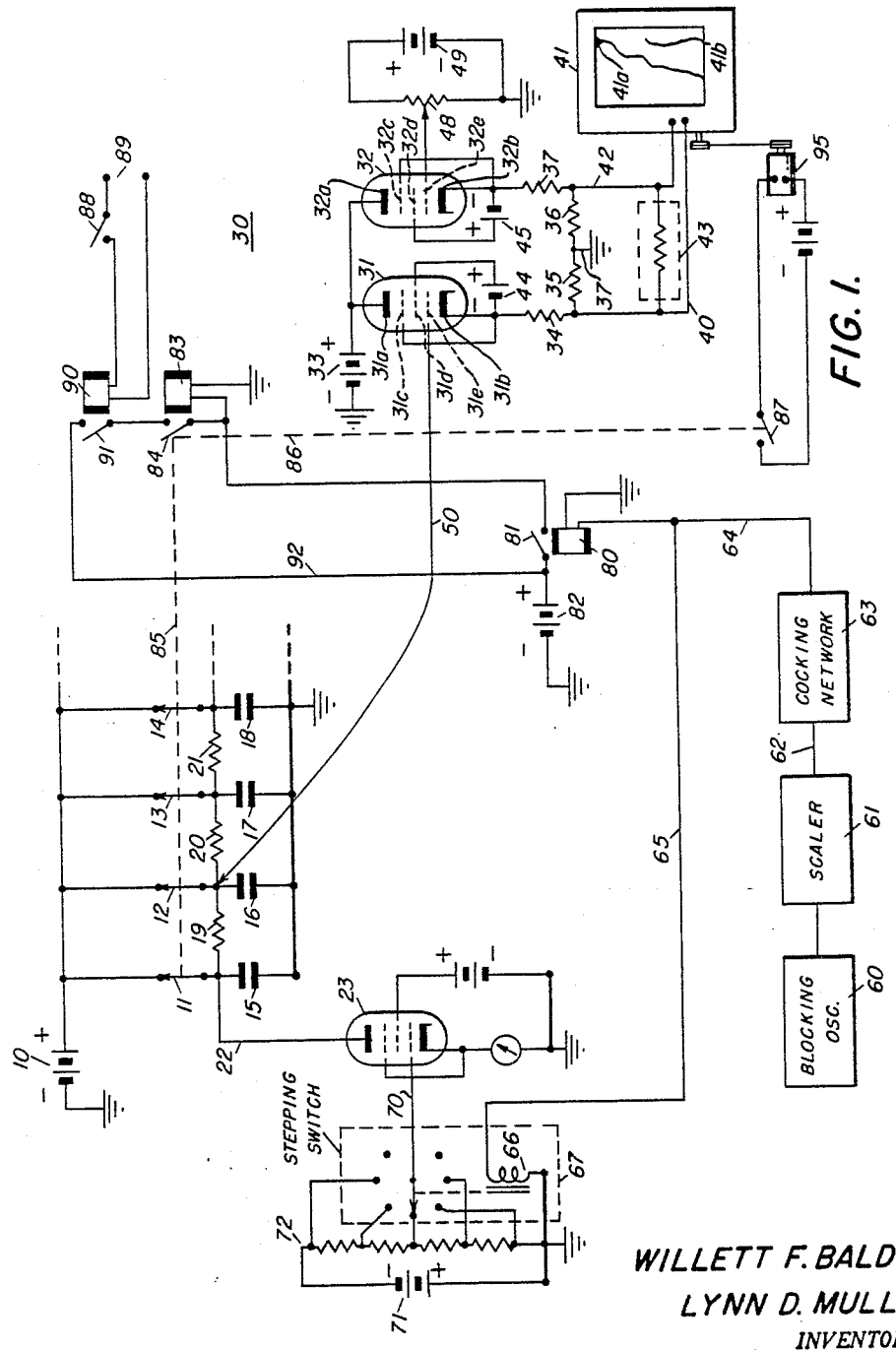

July 11, 1961     W. F. BALDWIN ET AL     2,991,936
EXTENDED RANGE MEASUREMENT OF SIMULATED FLUID FLOW
Filed July 22, 1954

WILLETT F. BALDWIN
LYNN D. MULLINS
          INVENTORS

BY *D. Carl Richards*
          ATTORNEY

United States Patent Office 2,991,936
Patented July 11, 1961

2,991,936
EXTENDED RANGE MEASUREMENT OF SIMULATED FLUID FLOW
Willett F. Baldwin and Lynn D. Mullins, Dallas, Tex., assignors, by mesne assignments, to Socony Mobil Oil Company, Inc., a corporation of New York
Filed July 22, 1954, Ser. No. 445,034
5 Claims. (Cl. 235—184)

This invention relates to the production and measurement of varying electrical potentials and more particularly to potentials in electrical systems designed to simulate physical processes such as the flow of liquids through the porous media. In a more specific aspect, the invention relates to an extended range low impedance electrical measuring system.

The physical analogy existing between fluid flow through a permeable membrane and electrical current flow through an electrical conductor has been utilized in simulated studies of oil bearing reservoirs undergoing primary and secondary recovery, e.g. gas drive, water flooding and the like. In comparing fluid flow to electrical flow, the hydrodynamic pressure gradient corresponds to the voltage or potential gradient while the ratio of permeability to viscosity corresponds to specific conductivity. In order to produce a reliable interpretation of phenomena in a flow system, voltages must be accurately measured.

In accmordance with the present invention, there is provided a low impedance recording voltmeter for recording unsteady state representations of production from reservoirs in an electrical model wherein potentials well above ground potential are measured. The measuring system comprises a pair of pentodes with a resistance interconnecting the cathodes of the pentodes. A center tap is provided on the resistance which is connected to ground. The input terminals of the low impedance recorder are connected across a fraction of the resistance symmetrical with respect to the center tap. Two different potentials may then be applied respectively to the control grids of the two pentodes whereby difference between the potential supplied to the two control grids will appear across the resistance network and will actuate the recorder while maintaining the recorder input at a low level with respect to ground.

In a further aspect, the invention comprises the combination of an electrical flow system together with a balanced-to-ground low impedance measuring system having vacuum tube isolation with reference to the flow system.

For a more complete understanding of the present invention, reference may now be had to the following description taken in conjunction with the accompanying drawing in which:

FIG. 1 illustrates a flow and potential measuring system.

Referring now to the drawing, there is illustrated an electrical flow system in which current from a source 10 flows through switches 11, 12, 13 and 14 to charge condensers 15, 16, 17 and 18 to voltages equal to the potential of source 10. When switches 11—14 are opened, current may be drained from condensers 15—18 by way of resistors 19, 20 and 21 and conductor 22 by controlling the conductivity of pentode 23.

Tht charge on condensers 15—18 represents fluid stored in a porous medium. Resistances 19—21 represent the resistance to fluid flow presented by the storing formations. A knowledge of the magnitude of the current flowing in conductor 22, the charges initially stored on condensers 15—18, and the magnitude of resistors 19—21 may be utilized to determine the flow characteristics of a given model reservoir.

Voltages in the flow system, in accordance with the present invention, are readily recorded as a function of time following the opening of switches 11—14 by a measuring system 30. Measuring system 30 comprises a pair of pentodes 31 and 32 whose anodes 31a and 32a are connected to the positive terminal of a source of anode potential 33. The cathodes 31b and 32b of pentodes 31 and 32 are connected to series resistance means comprising resistance elements 34, 35, 36, 37. The juncture between resistances 35 and 36 is connected to ground by way of center tap 37. The juncture between resistances 34 and 35 is connected by way of conductor 40 to one input terminal of a recorder 41. The recorder 41 includes a stylus 41a and a movable chart 41b. The juncture between resistances 36 and 37 is connected by way of a conductor 42 to the second input terminal of the low impedance recorder 41. A shunt impedance provided for such low impedance recorders is represented by the impedance in the dotted outline 43.

The suppressor grids 31c and 32c of tubes 31 and 32 are connected to their respective cathodes while the screen grids 31d and 32d are connected to their cathodes 31b and 32b by way of batteries 44 and 45, respectively. The control grid 32e of tube 32 is connected to the variable tap of a potentiometer 48. The extremities of the potentiometer are connected to the terminals of a battery 49. The conductivity of pentode 32 may thus be readily controlled by adjusting the potential from potentiometer 48.

The control grid 31e of tube 31 is connected by way of conductor 50 to a selected potential point in the flow system such as the juncture between resistors 19 and 20.

It can thus be seen that a bridge network is provided in which two adjacent arms are formed by the anode-cathode impedance of the pair of pentodes 31 and 32 and that two other arms of the bridge are formed by the cathode resistance network center tapped to ground.

The advantage of this system may readily be appreciated when it is understood that recording potentiometers, such as unit 41, ordinarily must be operated with one terminal at ground potential. If this is not done, difficulty is encountered in providing a proper zero setting for the recorder, the zero setting being in error due to the leakage currents encountered. By providing the resistance network 34—37 and controlling current flow independently through two pentodes 31, 32, the zero level on recorder 41 may be fixed at the level of the voltage from potentiometer 48. The difference in this voltage and the voltage on conductor 50 will then be effective in network 34—37 and thus at the input of recorder 41 to cause the stylus 41a to move laterally across the chart 41b. At the same time the input of recorder 41 is maintained at a relatively low level with respect to ground.

The low impedance level at the input of recorder 41 is provided by making resistances 34 and 37 large compared to resistances 35 and 36. By way of example and not by way of limitation, a network for use with 6J7 pentodes may be found satisfactory if resistances 34 and 37 are equal and of the order of one-half megohm whereas resistances 35 and 36 should be equal and of the order of 25 ohms. The shunt in outline 43 generally specified by the manufacturer of the associated recorder may be in the order of 300 ohms.

The measuring system 30 is operated in conjunction with the unsteady state model through electromechanical links energized from a pulse source which comprises a blocking oscillator 60 and a scaler 61 which serve to produce pulses in output channel 62 at a predetermined repetition rate. The pulses are applied to a cocking network 63 having an output channel 64. Output channel 64 is connected by way of conductor 65 to a relay coil 66 which is the actuating element in a stepping switch 67. The stepping switch is connected at its armature to a conductor 70 leading to the control grid of the production pentode 23. A battery 71 connected across a plurality of resistances 72 selectively connected to the terminals of the stepping switch 67 provides an operating bias for production pentode 23 which may be selectively varied by actuation of stepping switch 67. Conductor 64 is also connected to a relay 80 which actuates an armature 81 to close a circuit from a battery 82 through the coil of a second relay 83. The armature 84 of relay 83 is coupled by link 85 to switches 11—14, and by way of link 86 to a switch 87. A master switch 88 connected at terminals 89 to a suitable potential source serves to energize a third relay 90.

When the system is to be placed in operation, the armature of the stepping switch 67 is set either manually or by other suitable means on a contact in which the biasing potential on tube 23 maintains the tube at cutoff. Condensers 15—18 then become charged to a voltage equal to the potential from battery 10. Switch 88 is then closed to energize relay 90, thus closing the circuit through armature 91. Thereafter the next impulse from cocking network 63 applies a pulse through channel 65 to actuate stepping switch 67 so that its armature moves to a position such that bias on tube 23 permits tube 23 to conduct at a predetermined rate draining the charge from condensers 15—18 through production resistances 19—21. Simultaneously with the energization of relay 67, relay 80 is energized momentarily closing switch 81. Closure of switch 81 energizes relay coil 83 which closes switch 84 and provides a path for current from battery 82 through conductor 92, switch 91, switch 84 and relay coil 83 to ground. Current thus flowing from battery 82 locks the relay system into an operating position with switches 11—14 open, preventing further charging of condensers 15—18 from a source 10 and in addition maintains switch 87 closed, switch 87 being located in the energizing circuit of the chart driving motor 95 for the recorder 41.

Thereafter pulses from the cocking network 63 periodically energize stepping switch 67 to step-wise vary the grid potential on tube 23 in accordance with a predetermined production schedule, thus controlling the synthetic production rate of the model oil field through the production pentode 23. The recorder chart 41b begins its movement coincidentally with initiation of production, the probe conductor 50 being selectively connected to any one of the potential points in the field model. When a given production schedule has been completed, switch 88 is opened manually thus de-energizing the chart drive and closing the switches 11—14 to again charge condensers 15—18 to their normal state.

The present system for synchronizing production with recording permits greater definition of the variations in production parameters as a function of a production schedule by permitting extended range recording through the use of the dual pentode buffer system.

It will now be appreciated that the control grids 31e and 32e on pentodes 31 and 32 may both be connected to potential points in the field model and the potential difference recorded as a function of time or as a function of selected production schedule to provide an index to the character of variations in pressure along flow channels in earth formations at given permeabilities and production rates. Other modifications may now suggest themselves to those skilled in the art and it is intended to cover such modifications as fall within the scope of the appended claims.

What is claimed is:

1. In a system including a low impedance recorder having a chart movable past a stylus for recording unsteady state representations of production from reservoirs in an electrical model, wherein a control circuit including relay means simultaneously initiates production current flow in said model in response to a timing signal and movement of said chart past said stylus, the combination which comprises a buffer network connected between said model and a signal input on said recorder comprising a pair of pentodes each having a cathode, an anode and grids including a control grid with the anode-cathode impedance of said pentodes forming adjacent arms of a bridge, probe means for connecting the control grid of one of said tubes to a point in said model the voltage of which is dependent upon said production current flow, means for applying a selectively variable voltage to the control grid of the second of said pentodes, a high resistance interconnecting the cathodes of said pentodes, a center tap on said resistance connected to ground whereby the portions of said high resistance form the third and fourth arms of said bridge, and means for connecting input terminals on said recorder to a minor fraction of said resistance symmetrical to said center tap whereby said stylus is caused to move laterally across said chart in proportion to the difference between said selectively variable voltage and the current flow dependent voltage.

2. In a system including a low impedance chart recorder for recording as a function of time variations in voltage in an electrical charge storing model of production from subterranean reservoirs the combination therewith which comprises a first link between said model and said recorder which comprises an electronic bridge circuit including a pair of vacuum tubes each having at least a cathode, anode and a control grid and in which the anode-cathode resistances of said tubes form two adjacent arms of said bridge, a common cathode resistance and a means connected to selected voltage points in said model and to a control grid of one of said vacuum tubes in manner to control current flow through said circuit in dependence upon the potentials at said points, means for connecting the control grid of the other of said vacuum tubes to a selectively variable voltage source, means for connecting a signal input circuit of said recorder to said circuit, and a second link between said model and said recorder including means for actuating a chart of said recorder coincident with initiation of variations in the charge stored in said model to record said current flow in said network as a function of time.

3. In a system including a low impedance recorder and an electrical model of a reservoir in which voltage variations at contact points therein represent production therefrom, the combination which comprises means for measuring differences between potentials which are high relative to ground at said points but relatively small with respect to each other including a bridge network having a pair of pentodes forming two adjacent arms thereof, a center tapped resistance network interconnecting the cathodes of said pentodes forming third and fourth arms of said bridge network, means for connecting an input of said recorder across a portion of said resistance network symmetrical to the center tap, means for selectively connecting a control grid of one of said pentodes to a high potential point in said model, and means for connecting a control grid of the other of said pentodes to a selectively variable reference potential whereby the difference between said high potential and said reference potential will appear across said portion of said resistance network while maintaining said portion at a low voltage level with respect to ground.

4. In a system including a low impedance recorder for recording as a function of time certain variations in physical representations in an electrical model of the production from subterranean reservoirs wherein a secondary link is provided between said model and said recorder which includes means for actuating said recorder coincident with the production of variations in said representations on said electrical model, the combination therewith which comprises a primary link for connecting said model to said recorder including a bridge network having a pair of vacuum tubes each having at least a cathode, an anode, and a control grid in which two adjacent arms of said bridge are formed by the anode-cathode impedance of said pair of tubes, a common cathode resistance network center tapped to ground to form the third and fourth arms of said bridge, means for connecting a control grid of one of said tubes to selected points on said model to produce current flow through said tubes proportional to potentials at said selected points, means for connecting a control grid of the other of said tubes to a selectively variable voltage source, and output connections extending from the extremities of said resistance network to input terminals on said low impedance recorder.

5. In a system including a low impedance recorder for recording as a function of time certain variations in a physical condition in an electrical model of the production from subterranean reservoirs wherein a secondary link is provided between said model and said recorder which includes means for actuating said recorder coincident with the production of variations in said condition on said electrical model, the combination therewith which comprises an electronic bridge circuit including a pair of pentodes whose anode-cathode impedances form two adjacent arms thereof, a common cathode resistance network center tapped to ground to form the third and fourth arms of said bridge circuit, means for regulating current flow in one of said pentodes and said bridge circuit in dependence upon said condition in said model through an electrical connection between said model and a current controlling means in said one pentode, means for connecting a control grid of the other of said pentodes to a selectively variable voltage source, and output circuit connections extending from the extremities of said center tapped cathode resistance network to signal input terminals on said recorder.

References Cited in the file of this patent
UNITED STATES PATENTS

| | | |
|---|---|---|
| 2,541,313 | Vossberg | Feb. 13, 1951 |
| 2,582,676 | Bordewieck | Jan. 15, 1952 |
| 2,613,235 | Grunsky | Oct. 7, 1952 |
| 2,637,786 | Bordewieck | May 5, 1953 |
| 2,728,524 | Nehr | Dec. 27, 1955 |

FOREIGN PATENTS

| | | |
|---|---|---|
| 587,581 | Great Britain | Apr. 30, 1947 |

OTHER REFERENCES

"RCA Receiving Tube Manual," Tech. Series RC 16, September 1950, pp. 28–30.